United States Patent [19]

Sydansk

[11] Patent Number: 5,706,895
[45] Date of Patent: Jan. 13, 1998

[54] POLYMER ENHANCED FOAM WORKOVER, COMPLETION, AND KILL FLUIDS

[75] Inventor: Robert D. Sydansk, Littleton, Colo.

[73] Assignee: Marathon Oil Company, Findlay, Ohio

[21] Appl. No.: 568,869

[22] Filed: Dec. 7, 1995

[51] Int. Cl.$^6$ .................... E21B 21/00; E21B 33/13; E21B 43/00

[52] U.S. Cl. .................... 166/294; 166/309; 507/202; 507/213; 507/215; 507/216; 507/259; 507/925

[58] Field of Search .................... 166/278, 291, 166/294, 295, 309, 312; 507/202, 211, 213, 215, 216, 225, 259, 925, 926, 927, 928

[56] References Cited

U.S. PATENT DOCUMENTS

| | | | |
|---|---|---|---|
| Re. 32,114 | 4/1986 | Argabright et al. | 166/252 |
| 3,530,940 | 9/1970 | Dauber et al. | 166/305 |
| 3,637,021 | 1/1972 | Hutchison | 166/309 X |
| 4,039,459 | 8/1977 | Fischer et al. | 175/69 |
| 4,247,405 | 1/1981 | Wier | 166/272 |
| 4,282,928 | 8/1981 | McDonald et al. | 166/274 |
| 4,391,925 | 7/1983 | Mintz et al. | 523/130 |
| 4,440,653 | 4/1984 | Briscoe et al. | 507/202 |
| 4,442,018 | 4/1984 | Rand | 252/307 |
| 4,675,119 | 6/1987 | Farrar et al. | |
| 4,681,164 | 7/1987 | Stacks | 166/309 X |
| 4,726,906 | 2/1988 | Chen et al. | |
| 4,740,319 | 4/1988 | Patel et al. | |
| 4,989,673 | 2/1991 | Sydansk | 166/250 |
| 4,995,461 | 2/1991 | Sydansk | 166/295 |
| 5,129,457 | 7/1992 | Sydansk | 166/274 |
| 5,307,878 | 5/1994 | Sydansk | 166/309 X |
| 5,358,046 | 10/1994 | Sydansk et al. | 166/275 |
| 5,372,462 | 12/1994 | Sydansk | 166/294 X |

OTHER PUBLICATIONS

Ainley, "Development of Foam Fracturing and Cementing Fluids for Use in Tight Gas Sands," presented at AIChE, Denver, Colorado, Aug. 28–31, 1983.

T.A. Hudson et al., "Fluid Loss Control Through the Use of a Liquid-Thickened Completion and Workover Brine," SPE 10652, presented at SPE Formation Damage Control Symposium, Lafayette, LA, Mar. 24–25, 1982.

Sydansk, "Polymer-Enhanced Foams Part 1: Laboratory Development and Evaluation," SPE Advanced Technology Series, vol. 2, No. 2, Apr., 1994, pp. 150–159, SPE Paper 25168.

Sydansk, "Polymer-Enhanced Foams Part 2: Propagation Through High-Permeability Sandpacks," SPE Advanced Technology Series, vol. 2, No. 2, Apr., 1994, pp. 160–166, SPE Paper 25175.

*Primary Examiner*—George A. Suchfield
*Attorney, Agent, or Firm*—Jack L. Hummel; Jack E. Ebel

[57] ABSTRACT

Polymer enhanced foam fluid is utilized for completion, workover, and kill operations in wells penetrating subterranean formations. The foam is formed by appropriately adding a gas to an aqueous solution of a substantially noncrosslinked water soluble polymer and a surfactant. The solution and the foam are substantially free of crosslinking agents. The foam may be generated at the surface or in a wellbore.

33 Claims, 12 Drawing Sheets

POLYMER ENHANCED FOAM WORKOVER, COMPLETION, AND KILL FLUIDS

BACKGROUND OF THE INVENTION

1. Technical Field

The present invention relates to a method for workover, completion, and kill operations in wells penetrating subterranean formations, and more particularly, to a method wherein a polymer enhanced foam is utilized as a wellbore fluid during workover, completion, and kill operations in wells penetrating subterranean formations.

2. Background of the Invention

Subterranean well completion, workover, and kill operations are normally conducted while the well is filled with fluid. A completion, workover, or kill fluid is commonly placed in a wellbore prior to the operation and is often maintained in the wellbore for the duration of the operation. The completion, workover, or kill fluid applies a hydrostatic pressure against the formation fluid which is greater than the pressure exerted by the formation fluid attempting to intrude into the wellbore. This overbalanced hydrostatic pressure prevents the intrusion of formation fluids into the wellbore during performance of the given oil field wellbore operation which is necessary from an operational standpoint to prevent interference from formation fluids and which is also necessary from a safety standpoint to prevent blowouts and well kicks. In uncased wells, maintaining an overbalanced hydrostatic pressure also helps prevent the wellbore wall from caving in or sloughing into the wellbore. Other functions of completion, workover, and kill fluids are to minimize fluid loss from the wellbore into the surrounding formation, to help support casing and tubing strings, and to provide a medium through which completion and workover operations can be performed.

There are a number of well-known conventional completion, workover, and kill fluids which comprise high-density dispersions of fine solids in an aqueous liquid or a hydrocarbon liquid. The solid component of such a dispersion may be a "weighting agent" added to increase the fluid density, thereby providing a greater hydrostatic pressure in the wellbore. Weighting agents are generally inert inorganic solids in solution or suspension, to increase the density of the fluid. An exemplary completion, workover, and kill fluid is a dispersion of clay and/or gypsum in water.

Although conventional completion, workover, and kill fluids perform satisfactorily in many subterranean applications, high-density completion, workover, and kill fluids are generally unsuitable where the hydrostatic pressure gradient of the completion, workover, or kill fluid is greater than the fracture or parting pressure gradient of the rock surrounding the wellbore. Thus, conventional foams, consisting of a gas contained within an aqueous liquid medium, have been employed as alternative completion, workover, and kill fluids in formations susceptible to fracturing by conventional foams. The gas decreases the fluid density to a value sufficient to maintain an overbalanced condition in the well without hydraulically fracturing the formation.

Advantageous completion, workover, and kill fluids are those which prevent formation fluid intrusion into the wellbore while preventing appreciable wellbore fluid leakoff into the formation. Leakoff is the migration of the completion, workover, or kill fluid from the wellbore across the wellbore face into the surrounding formations, resulting in loss of the fluid. Fluid leakoff can undesirably result in formation damage, or permeability reduction, which is manifested in reduced hydrocarbon recovery from the formation or reduced injectivity into the formation. Reduction in the fluid flow capacity can arise from relative permeability effects when an aqueous fluid invades an oil- or gas-bearing formation or as a result of chemical reactions with minerals, such as clays, present in the formation. Leakoff is also undesirable because it requires replacement of the lost completion, workover, or kill fluid. Although it is possible to maintain the hydrostatic pressure overbalance in the face of severe fluid leakoff by replenishing the lost completion, workover, or kill fluid, this practice can be cost prohibitive. Thus, minimizing leakoff decreases the cost of the completion, workover, or kill operation. Leakoff can also result in a well blowout with serious safety and environmental consequences.

In response to the problem of leakoff, it is common to place a fluid in the wellbore containing additives termed, "lost circulation materials," that specifically inhibit fluid communication between the wellbore and surrounding formations across the wellbore face. Lost circulation materials are frequently polymeric species as described in U.S. Pat. Nos. 4,740,319; 4,726,906; 4,675,119; and 4,282,928. A liquid medium having a lost circulation material dissolved or dispersed therein is termed a lost circulation fluid. Despite the general effectiveness of many conventional lost circulation fluids, certain subterranean conditions remain problematic for such fluids. In particular, conventional lost circulation fluids often do not effectively inhibit lost circulation in formations having relatively high permeability matrix or relatively high permeability voids. Conventional lost circulation fluids may also be inapplicable in water-sensitive formations, formations susceptible to relative permeability effects, or formations susceptible to fracturing or parting.

Thickeners are often included in weighted completion, workover, and kill fluids known in the art for leakoff inhibition. See, for example, Hudson et al., SPE Paper No. 10652, which discloses a weighted brine containing a fluid loss control agent, or U.S. Pat. No. 4,391,925 to Mintz et al., which discloses a multiphase kill fluid comprising a number of constituents including a hydrocarbon, a surfactant, a clay, and an organic polymer.

Under downhole conditions where the wellbore is in direct communication with high permeability voids, it can be extremely difficult to prevent fluid leakoff. Conventional completion, workover, and kill fluids generally do not exhibit sufficient flow resistance to prevent them from escaping the wellbore into the formation via the high permeability voids. Conventional foams may have increased flow resistance, but they often lack sufficient structure to adequately stop leakoff and tend to reduce the rate of fluid loss, rather than stopping leakoff altogether.

Conventional completion, workover, and kill fluids may also be unsuitable in water-sensitive formations because of the risk of formation damage due to incompatibilities between the completion, workover, and kill fluid and the formation, particularly when leakoff does occur. Further, conventional completion, workover, and kill fluids are often difficult to remove from the formation after any leakoff that occurs.

Conventional foams may be more compatible with the formation, but they exhibit relatively high instability under certain formation conditions. For example, conventional foams tend to exhibit instability in the presence of crude oil and collapse rapidly into separate gas and liquid phases. They also generally lack adequate structure and healing capabilities to remain foams while tubulars and other well hardware are moved in the well. In addition, conventional foams often degrade when placed in formations having high downhole temperatures or in formations having brines exhibiting a high salt or hardness content.

Crosslinked polymer gels as taught by U.S. Pat. No. 4,989,673 have demonstrated performance advantages over the above-recited conventional completion, workover, and kill fluids and lost circulation fluids, because in many instances the gels effectively inhibit fluid loss in formations having high permeability matrix or high conductivity voids, while generally avoiding significant damage to water-sensitive formations. The relatively high chemical cost of crosslinked polymer gels, however, often limits their practical utility from an economic standpoint. Crosslinked polymer gels also have a relatively high hydrostatic pressure gradient in the wellbore that is undesirable for formations susceptible to fracturing or parting by conventional fluids of normal density. Gels are also difficult to remove from the formation when leakoff has occurred.

Foamed gels, such as a polyacrylamide gel formed with a Cr(III) crosslinker, have been used as workover, completion, and kill fluids. Foamed gels generally have superior leakoff properties, stability, and structure relative to polymer enhanced foams. However, the greater structure tends to interfere with movement of hardware in the wellbore. In addition, foamed gels do not reheal readily when hardware is moved. Further, Cr(III) is increasingly subject to environmental restrictions, particularly for well operations near the surface, where fluids could migrate from the well into aquifers which provide a domestic water supply. If foamed gels invade the subterranean formation significantly, they can be difficult to remove and generally require the use of a gel breaker.

Despite the existence of numerous completion, workover, and kill fluids in the art, many have limited utility. Thus, a need exists for a completion, workover, and kill fluid having utility in hydrocarbon recovery operations over a broad range of operating conditions which can be encountered in situ. Specifically, a need exists for a low density completion, workover, and kill fluid which effectively maintains a sufficient hydrostatic pressure in the wellbore under adverse conditions to prevent or minimize the intrusion of formation fluids into the wellbore without exhibiting significant leakoff into the formation. A need also exists for a completion, workover, and kill fluid which does not damage the hydrocarbon formation significantly. A further need exists for a low density completion, workover, and kill fluid which does not induce hydraulic fractures in the adjacent subterranean formation. The completion, workover, or kill fluid should be inexpensive and easily prepared at the wellsite from readily available constituents. The fluid should be nonflammable, non-toxic, and chemically unreactive with surface and wellbore hardware. Further, the fluid should have a consistency which permits downhole operations through it. In addition, the fluid should be easy to remove completely from the wellbore after the completion, workover, or kill operation is finished.

Accordingly, it is an object of the present invention to provide a completion, workover, and kill fluid that effectively performs in a wellbore penetrating a subterranean formation having a relatively low fracture or parting pressure gradient without substantially fracturing or parting the formation.

It is another object of the present invention to provide a completion, workover, and kill fluid that effectively prevents leakoff under a broad range of subterranean conditions.

It is still another object of the present invention to provide a completion, workover, and kill that effectively prevents leakoff in a subterranean formation exhibiting relatively high permeability or high conductivity voids.

It is yet another object of the present invention to provide a completion, workover, and kill fluid that is relatively stable under harsh formation conditions including the presence of high temperatures, crude oil, high salinity brines, or high hardness brines.

It is a further object of the present invention to provide a completion, workover, and completion, workover, and kill fluid that is cost effective and practical to use in the field.

It is a still further object of the present invention to provide a completion, workover, and kill fluid which is self healing and has a consistency that permits downhole operations to be performed through it.

It is yet a further object of the present invention to provide a completion, workover, and kill fluid which is easy to remove from the wellbore and the formation after the completion, workover, or kill operation is finished.

These objects and others are achieved in accordance with the invention described hereafter.

SUMMARY OF THE INVENTION

To achieve the foregoing and other objects, and in accordance with the purposes of the present invention, as embodied and broadly described herein, the present invention is a process for use during hydrocarbon well completion, workover, and kill operations. An aqueous solution of a water-soluble, substantially noncrosslinked polymer and a water-soluble surfactant is prepared. The solution is substantially free of agents capable of crosslinking the polymer. A gas is added to the aqueous solution so as to form a polymer enhanced foam which is placed in a well penetrating a subterranean formation.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DESCRIPTION OF THE PREFERRED EMBODIMENTS

Figure 1A:
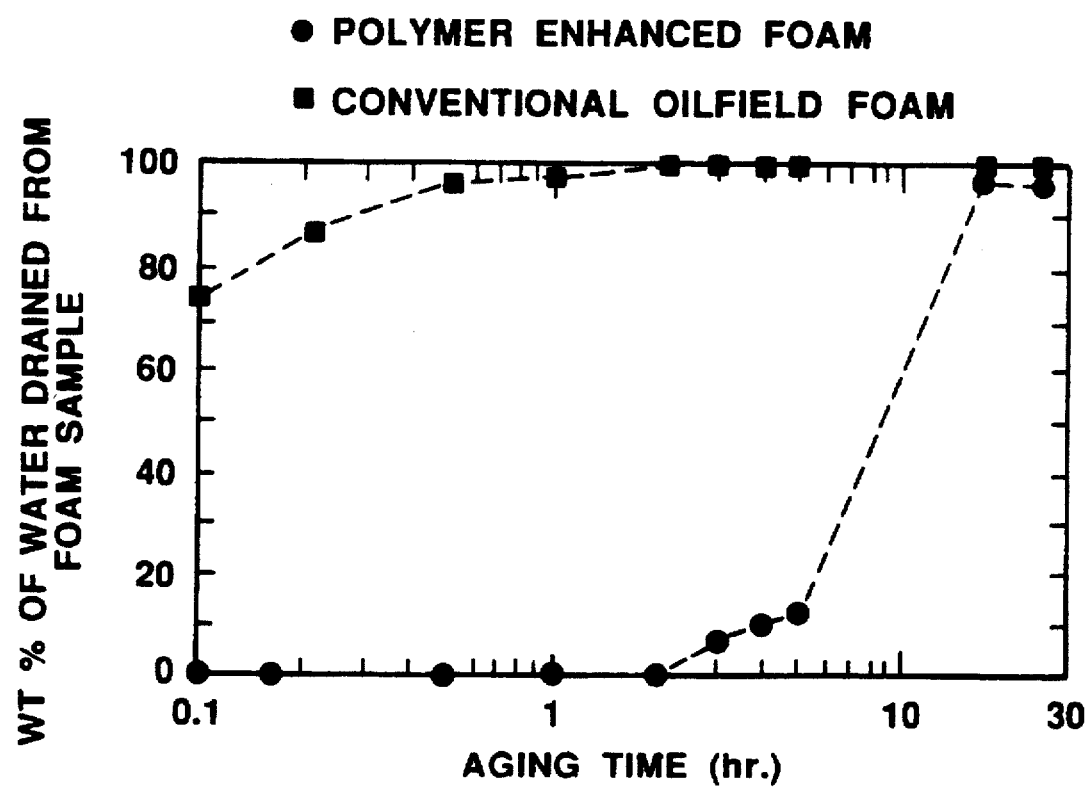
FIG. 1A is a graph showing the weight per cent of water drained from polymer-enhanced and conventional foam samples as a function of foam aging time in a graduated cylinder.

A number of specific terms are used throughout the specification to describe the process of the present invention and are defined as follows. A subterranean hydrocarbon-bearing formation is a geological structure comprising a substantially continuous geological material. The term "wellbore" is defined herein as a bore hole extending from the earth surface to a subterranean hydrocarbon-bearing formation. Thus, a wellbore is a conduit providing fluid communication between the surface and the formation penetrated thereby. A production wellbore enables the removal of fluids from the formation to the surface and an injection wellbore enables the placement of fluid into the formation from the surface. It is noted that a given wellbore can function interchangeably as a production wellbore or an injection wellbore depending on whether a fluid is being removed from or placed in the wellbore. The term "well" is synonymous with the term "wellbore."

A "foam" is a stabilized gas dispersion maintained within a liquid phase, wherein a plurality of gas bubbles are separated from one another by interfacially stabilized liquid films. The dispersed gas phase constitutes at least 20 per cent of the total volume of the foam. Conventional oilfield foams consist of a gas dispersed in a surfactant solution made up of a surfactant and a solvent. The surfactant acts as a foaming agent to facilitate and stabilize the gas dispersion within the liquid phase. A "polymer enhanced foam" is a specific type of oilfield foam comprising a gas dispersed in an aqueous surfactant solution, wherein the aqueous surfactant solution further includes a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter.

The process of the present invention is performed by generating and placing a polymer enhanced foam within a wellbore in the specific manner described hereafter. The polymer enhanced foam is generated from a substantially noncrosslinked water soluble polymer, an aqueous solvent, a surfactant, and a gas. It is important to note that the foam composition is substantially free of any polymer crosslinking agent which could otherwise crosslink the polymer and convert the liquid phase of the foam to a crosslinked polymer gel at some point in the process.

The polymer component of the foam is substantially any water-soluble, viscosity-enhancing polymer that is substantially noncrosslinked. Either a biopolymer or a synthetic polymer has utility herein. Biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches. Synthetic polymers having utility herein include polyvinyl alcohol, polyethylene oxide, polyvinyl pyrrolidone, and acrylamide polymers. Exemplary acrylamide polymers are polyacrylamide; partially hydrolyzed polyacrylamide; acrylamide copolymers; acrylamide terpolymers containing acrylamide, a second species, and a third species; and acrylamide tetrapolymers containing acrylamide, acrylate, a third species, and a fourth species. Polyacrylamide (PA) is defined as an acrylamide homopolymer having substantially less than about 1% of its acrylamide groups converted to carboxylate groups. Partially hydrolyzed polyacrylamide (PHPA) is an acrylamide homopolymer having more than about 1%, but not 100%, of its acrylamide groups converted to carboxylate groups. Useful acrylamide polymers are prepared according to any conventional method, but preferably have the specific properties of an acrylamide polymer prepared according to the method disclosed in U.S. Pat. No. Re. 32,114, incorporated herein by reference.

The average molecular weight of an acrylamide polymer having utility herein is generally in a range between about 10,000 and about 50,000,000, preferably between about 250,000 and about 20,000,000, and most preferably between about 1,000,000 and about 18,000,000. The polymer concentration in the liquid phase of the foam is generally at least about 500 ppm, preferably at least about 2,000 ppm, and most preferably within a range between about 3,000 ppm and about 10,000 ppm.

The aqueous solvent of the present polymer enhanced foam is substantially any aqueous liquid capable of forming a solution with the selected polymer. The term "solution" as used herein, in addition to true solutions, is intended to broadly encompass dispersions, emulsions, or any other homogeneous mixture of the polymer in the aqueous solvent. The solvent is preferably either a fresh water or a brine, such as a produced water from the subterranean formation. Produced water can be advantageous because of its low-cost availability and because it enables the practitioner to return the produced water to the formation, thereby eliminating disposal thereof.

The surfactant of the polymer enhanced foam is substantially any water-soluble foaming agent suitable for oilfield use that is compatible with the specific polymer selected as will be evident to the skilled artisan. As such, the surfactant can be anionic, cationic, or nonionic. A preferred surfactant is selected from the group consisting of ethoxylated alcohols, ethoxylated sulfates, refined sulfonates, petroleum sulfonates, and alpha olefin sulfonates. The concentration of surfactant in the liquid phase of the foam is in a range between about 20 ppm and about 50,000 ppm, preferably between about 50 ppm and about 20,000 ppm, and most preferably at least about 1000 ppm. In general, the performance of the polymer enhanced foam in the method of the present invention is relatively insensitive to the particular species and concentration of the surfactant selected, subject to the above-recited criteria, particularly when the selected polymer is an acrylamide polymer.

Virtually any gas can be employed in the present polymer enhanced foam to the extent the gas is substantially chemically inert with respect to the other foam components and with respect to wellbore production or injection equipment. A preferred gas is one which is readily available in the field. Such gases include nitrogen, air, carbon dioxide, flue gas, produced gas, and natural gas. The quality of the polymer enhanced foam product, i.e., the volume percentage of gas in the foam, is typically between about 20% and about 99%, more preferably between about 60% and about 98%, and most preferably between about 70% and about 97%. As is apparent to one skilled in the art, foam density decreases with increasing foam quality.

It should be noted that some gases, particularly $CO_2$, may become liquids or supercritical fluids under temperature and pressure conditions likely to be encountered in a well. In either case, the foam may become a high viscosity emulsion. $CO_2$ emulsions have significantly lower densities than water. An emulsion can be used in many situations where it is desirable to use a low density workover, completion, or kill fluid. $CO_2$ emulsions containing polymers expand with decreasing pressure and are energized fluids. As used herein, the term "polymer enhanced foam" includes emulsions.

Foam generation requires mixing the liquid phase and the gas either at a high velocity or through a small orifice as can be provided by any conventional artificial foam generator. The liquid phase is preferably preformulated by dissolving the surfactant and polymer in the aqueous solvent prior to foam generation. The foam is then generated, for example, at the surface by passing the liquid phase and gas through a foam generator, and the resulting foam is delivered to the wellbore for injection therein. Alternatively, the foam is generated at the surface by coinjecting the gas and liquid phase into the wellbore across an injection tee acting as a foam generator. In another alternative, the foam is generated downhole by coinjecting the gas and liquid phases via a common tubing string or separate tubing strings into the wellbore and passing the two streams through a downhole foam generator. A foam breaker and/or other materials known to those skilled in the art may be added to the foam or to the aqueous solution.

The pH of the liquid phase in the polymer enhanced foam is generally within a range of about 4 to about 10. In most cases, the pH of the liquid phase inherently falls within the above-recited range without any pH adjustment thereof. However, the pH of the liquid phase can be adjusted in any manner known to the skilled artisan in accordance with conventional oilfield procedures to achieve a desired pH range. Nevertheless, it has been found that the present process is relatively insensitive to the pH of the liquid phase.

In the practice of the present invention, the polymer enhanced foam may be placed in a wellbore as either a completion fluid, a workover fluid, or a kill fluid. Placement of the foam is further facilitated by the relatively highly shear thinning properties of the polymer enhanced foam. The polymer enhanced foam exhibits relatively high effective viscosities under low shear conditions at the surface and in the relatively low shear regions within the wellbore where the foam is placed. The polymer enhanced foam, however, exhibits relatively low effective viscosities under the high flow rate and high shear rate conditions encountered as it is pumped into the wellbore due to the ability of the foam to highly shear thin. Thus, the high shear thinning ability and the low friction loss qualities of the foam allow the foam to be pumped easily. Nevertheless, once the polymer enhanced foam is successfully placed in the wellbore, it beneficially thickens, thereby achieving a sufficient degree of structure and a sufficient critical pressure gradient for flow to limit invasion of the polymer enhanced foam into the subterranean formation adjacent the wellbore.

Relative to conventional polymer-free foams, the polymer enhanced foam is highly stable over a wide range of temperatures, pressures, water salinities, and water hardnesses. The polymer enhanced foam also resists collapse and fluid drainage in the presence of many environmental contaminants. In particular, the polymer enhanced foam is stable in the presence of liquid hydrocarbons, unlike most conventional foams. The foam can be self healing so that if foam degradation occurs as equipment is moved through the foam, the foam is capable of reforming itself. The polymer enhanced foam resists flow from the wellbore and does not substantially invade the adjacent formation. If the formation is invaded, the energized nature of the foam aids in its removal. If the pressure is reduced, the gas bubbles in the foam expand and push a substantial portion of the foam out of the formation. When the foam eventually breaks down, the gas, surfactant, and polymer resulting from foam breakdown may enhance fluid flow between the formation and the well. The gases, surfactants, and polymers of polymer enhanced foams are commonly used as enhanced or improved oil recovery agents. Nevertheless, if desired, a conventional breaker can be injected into the treatment region of the wellbore and/or any invaded near-wellbore portion of the formation to degrade the foam or polymer in situ and restore the wellbore and near-wellbore region of the formation to their original condition.

Polymer enhancement of the foam also advantageously increases the structural strength and critical pressure gradient for flow of the foam relative to conventional polymer-free foams. The term "strength" refers to the resistance of a foam to deformation when pressure or force is applied to the foam, and the "critical pressure gradient for flow" is defined herein as the maximum pressure that can be applied to the foam without foam flow.

In general, the polymer enhanced foam of the present invention should have a significant degree of structure. The viscosity and degree of structure of the polymer enhanced foam formulated in the manner of the present invention are primarily functions of the polymer properties and the polymer concentration. In general, the viscosity and degree of structure of a polymer enhanced foam containing an acrylamide polymer are increased by increasing the polymer concentration of the liquid phase. However, a more cost-effective and often preferred means for achieving the same effect is to employ a higher molecular weight polymer or, in some cases, a polymer having a higher degree of hydrolysis at a relatively fixed polymer concentration. Conversely, a reduction in viscosity and the degree of structure is achieved by using a lower molecular weight polymer, a lower polymer concentration, or, in some cases, a polymer having a lower degree of hydrolysis. Thus, the skilled practitioner can modify the viscosity and the degree of structure of the present polymer enhanced foam in the above-described manner to correspond with the leakoff potential of the region of the formation adjacent the wellbore in which the completion, workover, or kill fluid is used.

As is apparent from above, the low leakoff characteristics of the polymer enhanced foam are a function of its critical pressure gradient for flow, which can alternatively be termed yield pressure. The critical pressure gradient for flow is defined herein as the maximum pressure under specified conditions that can be applied to the foam without foam flow. The foam should exhibit a critical pressure gradient for foam flow higher than the pressure gradient across the wellbore face or existing in the near-wellbore region. By satisfying this criterion, the foam will not flow into or through the formation adjacent the wellbore. Because the polymer enhanced foam of the present invention has a relatively high critical pressure gradient for foam flow, particularly in comparison to conventional foams, the polymer enhanced foam also performs well as a low leakoff fluid.

Embodiments of the present process have been described above wherein the polymer enhanced foam is generated prior to or during placement of the foam in the wellbore. It is apparent to the skilled artisan from the instant disclosure that there are numerous other related applications within the scope of the present invention.

The following examples demonstrate the practice and utility of the present invention, but are not to be construed as limiting the scope thereof. In all of the examples, foams are generated by coinjecting a foam-forming solution and a gas into a high permeability foam generating sand pack. All experiments are conducted at room temperature unless otherwise noted. The foam forms within about the first 2.5 cm of the sand pack and then advances through the rest of the sand pack. Thus, the foam generating sand pack may function as a foam generating device, as a model of a porous medium, or both simultaneously. In each of the following examples, if a single sand pack is utilized, it performs both functions, and if two sand packs are utilized, the first sand pack is for foam generation and the second is a test sand pack serving as a model of a porous medium. Foam properties, such as average apparent viscosity, are determined from data obtained for the foam in the sand pack, based on the entire length of the sand pack. Properties of bulk foam samples are similar to those observed in sand packs.

EXAMPLE 1

Polymer Enhanced Foam Stability In Glassware

Conventional and polymer enhanced foams are prepared to compare their stability and, in particular, their resistance to physical foam collapse and water drainage under the influence of gravity. One of the conventional foams and the polymer enhanced foam are substantially identical in composition except for the presence of an unhydrolyzed polyacrylamide at a concentration of 7,000 ppm in the aqueous phase of the polymer enhanced foam. The molecular weight of the polymer is 11,000,000. The liquid phase of both foams is made up of a fresh water solvent containing 1,000 ppm of an ethoxylated sulfate surfactant marketed commercially as ENORDET 1215-3S by Shell Chemical Co., Enhanced Oil Recovery Chemicals, P.O. Box 2463, Houston, Tex. 77001. The surfactant has the formula $C_{12-15}$-$EO_3$-$SO_4Na$. A second conventional foam is prepared with the same solvent and 5,000 ppm of ENORDET 1215-3S surfactant in the aqueous phase.

The foam samples are generated by coinjecting the liquid phase and $N_2$ gas into a foam generating sand pack. The sand pack has a permeability of 67 darcies, a length of 30 cm and a diameter of 1.1 cm. All flooding is conducted at 170 kPa constant differential pressure across the sand pack and atmospheric backpressure. The polymer enhanced foam propagates at a frontal advance rate of 207 m/day and exhibits an average apparent effective viscosity within the sand pack of 89 cp, while the first conventional foam propagates at a frontal advance rate of 8,230 m/day and exhibits an average apparent effective viscosity of only 2 cp at the same differential pressure. Thus, the polymer enhanced foam has a substantially larger effective viscosity than the counterpart conventional foam.

Figure 1B:
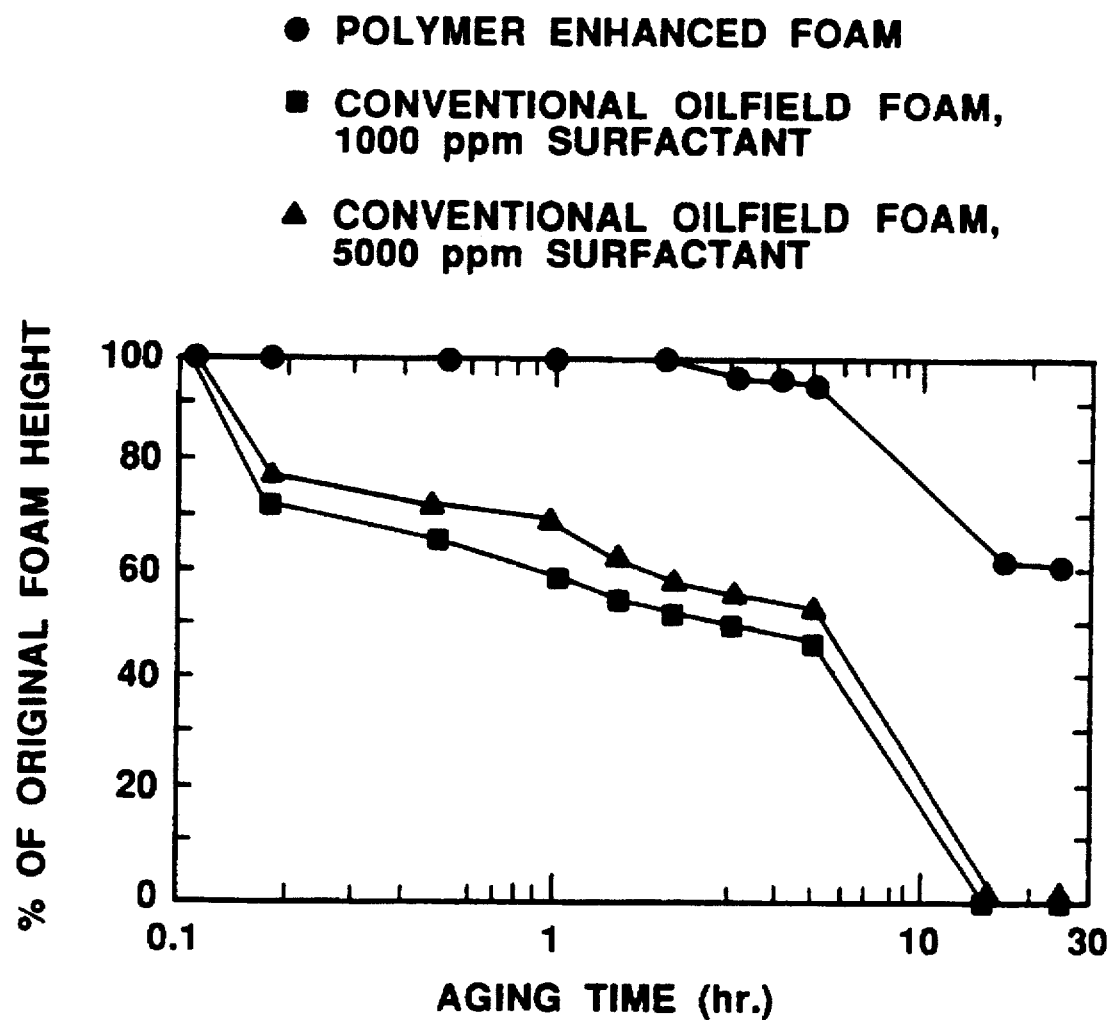
FIG. 1B is a graph showing the percentage of original foam height as a function of aging time for the foam samples of FIG. 1A and an additional conventional foam sample.

A 100 $cm^3$ sample of each fine-textured foam is collected as effluent from the sand pack and placed in a stoppered graduated cylinder for aging at ambient temperature. The positions of the foam/water and foam/air interfaces in the graduated cylinders are measured as a function of time to determine the rates of water drainage and foam collapse, respectively for each of the samples. The results are shown in FIGS. 1A and 1B, respectively. It is apparent therein that the rates of water drainage and foam collapse are much greater for the conventional polymer-free foam than the polymer enhanced foam. A 100 $cm^3$ sample of the 5,000 ppm surfactant conventional foam is also obtained in the same manner. The results are highly comparable to the conventional foam sample with 1,000 ppm surfactant, as shown in FIG. 1B. Thus, this example shows that the polymer enhanced foam is more stable with respect to water drainage and foam collapse under the influence of gravity than the conventional polymer-free foam.

Further, increasing the surfactant concentration increases the stability of the conventional foam slightly, but the effect is much smaller than the effect of adding polymer to the aqueous solution. This example demonstrates that adding a relatively small amount of polymer to a conventional foam increases the foam stability significantly more than adding additional surfactant. Thus, significant cost savings and improved performance can be achieved by adding a polymer to a foam rather than increasing the surfactant concentration. The stability of a polymer enhanced foam is often greater in a porous medium than in laboratory glassware.

EXAMPLE 2

Rheometer Viscosity

Figure 2:
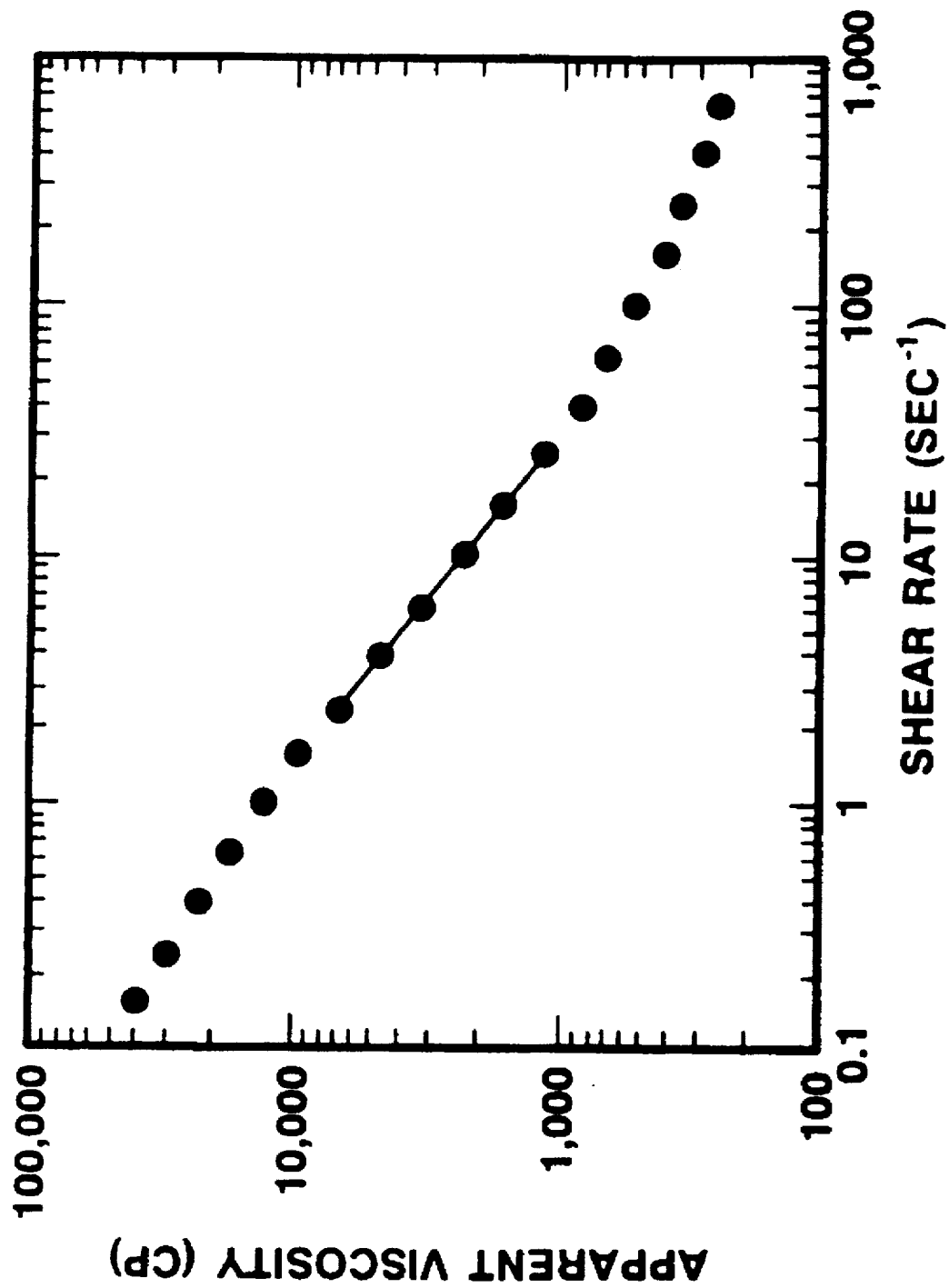
FIG. 2 is a graph of the apparent viscosity of a bulk sample of a polymer enhanced foam of the present invention as a function of the shear rate.

A polymer enhanced foam is prepared in a foam generating sand pack by combining $N_2$ gas with a solution of a produced reservoir brine containing 7,000 ppm PHPA and 2,000 ppm of STEPANFLO 20, a $C_{14-16}$ alpha olefin sulfonate surfactant marketed by Stepan Chemical Co., 22 Frontage Road, Northfield, Ill. 60093. The brine contains 5,800 ppm total dissolved solids and has principle constituents in the following concentrations: 560 ppm $Ca^{++}$, 160 ppm $Mg^{++}$, 1,500 ppm $Na^+$, 200 ppm $K^+$, 2,200 ppm $SO_4^{-2}$, and 1,400 $Cl^-$. The PHPA is 30 per cent hydrolyzed and has a molecular weight of 11,000,000, and the foam quality is 88 per cent as produced. The foam is aged for five minutes, and viscosity measurements are then made on the bulk foam in a Rheometrics RFS rheometer using the steady shear-rate mode. Shear rates from 0.15 to 700 $sec^{-1}$ are studied. The polymer enhanced foam is a shear-thinning fluid over the entire range of shear rates. The minimum measured viscosity is 250 cp, and the maximum viscosity is over 40,000 cp. The power-law viscosity values ($\eta$) are determined to be N=0.24 and K=13,000 cp over the linear range of data obtained, where $\eta = K(y)^{N-1}$ and y is the shear rate in units of $sec^{-1}$. The results are shown in FIG. 2, with the power law curve fit shown as a solid line. The polymer enhanced foam exhibits substantial shear-thinning viscosity behavior, indicating that the foam would be relatively easy to pump into and through wellbore tubulars.

A conventional foam is also prepared without the surfactant, and it is so unstable that is not readily feasible to obtain similar measurements.

This example shows that the bulk polymer enhanced foam is highly shear thinning and that very large effective viscosities can be attained at low shear rates. The rheological behavior of the bulk polymer enhanced foam is similar to that observed for the foam in porous media.

EXAMPLE 3

Critical Pressure Gradient For Flow

Polymer enhanced and conventional foams are prepared using Denver, Colo., U.S.A., tap water, $N_2$, 2,000 ppm in the aqueous phase of BIO-TERGE AS-40, a $C_{14-16}$ alpha olefin sulfonate surfactant obtained from Stepan Chemical Company, 22 Frontage Road, Northfield, Ill. 60093. The polymer enhanced foam also contains 7,000 ppm in the aqueous phase of 30 per cent hydrolyzed PHPA with a molecular weight of 11,000,000. The tap water contains 30 ppm of C as $CO_3^{-2}$, 78 ppm of $Ca^{++}$, 18 ppm of $Mg^{++}$, 130 ppm of $Na^+$, 25 ppm of $Cl^-$, and 250 ppm of total dissolved solids. The critical pressure gradient for foam flow is determined for the polymer enhanced foam in a sand pack having a permeability of 140 darcies and a length of 30 cm. The sand pack is used in this case as a model of a porous medium. Flooding experiments are conducted at atmospheric backpressure and at 3100 kPa backpressure for foam qualities between 57 and 93 per cent. The critical pressure gradient for foam flow of the polymer enhanced foam is in the range of 452 to 678 kPa/m. The critical pressure gradient for foam flow for a conventional foam having the same composition but without the polymer is 136 to 158 kPa/m. The higher critical pressure gradient of the polymer enhanced foam indicates that the polymer enhanced foam has significantly more structure and less leakoff tendency than the conventional foam.

The critical pressure gradient for foam flow is also determined for the polymer enhanced foam flowing through a 1.45 mm ID tube. The tube is used as a model of narrow tubing. The critical pressure gradient for flow is less than 2 kPa/m, indicating that the foam has a negligible yield strength and yield pressure as it passes through the tube. Thus, the foam should flow readily through wellbore tubulars and be easy to pump through well tubulars.

This example illustrates that the polymer enhanced foam of the present invention has a greater critical differential pressure gradient for foam flow, yield pressure, yield strength, and structure than its counterpart conventional foam. Thus, the polymer enhanced foam has better leakoff properties than conventional foams. Moreover, the polymer enhanced foam has a negligible yield strength and yield pressure as it flows through pipes and tubulars.

EXAMPLE 4

Viscosity As Function Of Foam Quality

A sample of a polymer enhanced foam and a sample of a conventional polymer-free foam that is substantially identical in composition to the polymer enhanced foam except for the absence of a polymer component are prepared to compare the effective viscosities of the two foams as a function of foam quality. Both foams are formulated from $N_2$ and a brine solvent having a $C_{14-16}$ alpha olefin sulfonate surfactant dissolved therein at a concentration of 2,000 ppm. The brine contains 5,800 ppm total dissolved solids and has principle constituents in the following concentrations: 560 ppm $Ca^{++}$, 160 ppm $Mg^{++}$, 1,500 ppm $Na^+$, 200 ppm $K^+$, 2,200 ppm $SO_4^{-2}$ and 1,400 ppm $Cl^-$. The aqueous phase of the polymer enhanced foam additionally contains a partially hydrolyzed polyacrylamide at a concentration of 7,000 ppm. The partially hydrolyzed polyacrylamide has a molecular weight of 11,000,000 and is 30% hydrolyzed.

A sand pack substantially the same as that of Example 2 is flooded with each foam over a range of foam qualities. A first polymer enhanced foam sample is flooded at a backpressure of 1,725 kPa and a differential pressure of 345 kPa. The first sample propagates at an apparent frontal advance rate of between about 158–198 m/day. A second polymer enhanced foam sample is flooded at a backpressure of 3,100 kPa and a differential pressure of 345 kPa, and the apparent frontal advance rate is between 146 and 213 m/day. The conventional foam sample is flooded at atmospheric backpressure and a differential pressure of 138 kPa and propagates at a frontal advance rate between about 335 and 1,463 m/day.

Figure 3:
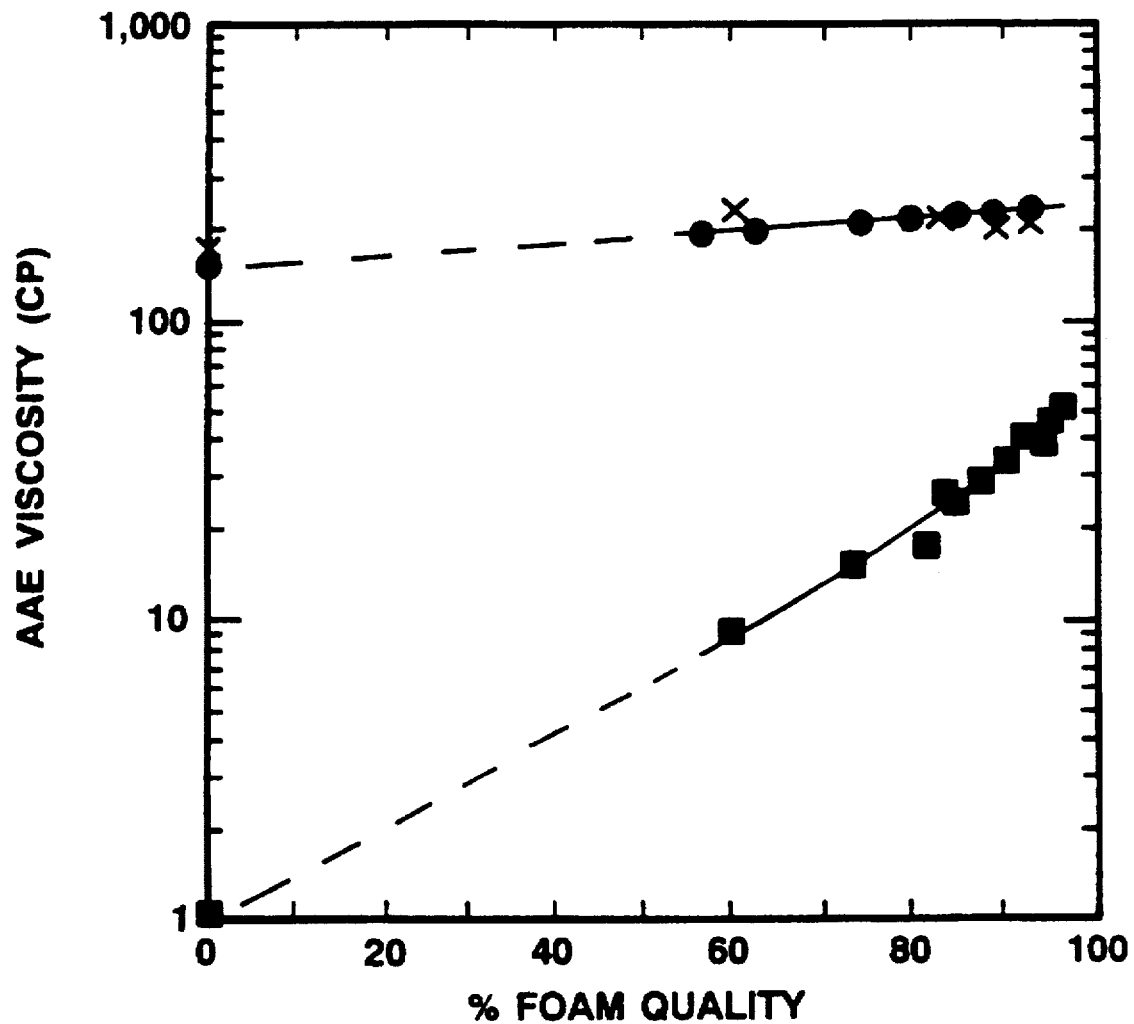
FIG. 3 is a graph of the average apparent effective viscosity in a sand pack as a function of foam quality for conventional and polymer enhanced foams.

The results are set forth in FIG. 3 and indicate that the sensitivity of the average apparent viscosity of the polymer enhanced foam to foam quality is much less than that for the counterpart conventional foam. Furthermore, the effective viscosity of the polymer enhanced foam at any given foam quality is much greater than that of the conventional foam. In FIG. 3, "PEF" refers to polymer enhanced foam, and "BP" refers to backpressure.

EXAMPLE 5

Frontal Advance Rate Of Polymer Enhanced Foam And Polymer Solution

A polymer enhanced solution is prepared, also using a reservoir brine and the same surfactant and polymer as in Examples 3 and 4. The solution contains 2,000 ppm surfactant and 7,000 ppm of PHPA. A portion of the solution and then another portion of the solution and $N_2$ gas are injected into a 170 darcy sand pack at atmospheric backpressure and 22° C., with a constant pressure drop between 138 and 1,380 kPa. The sand pack is 30 cm long and has an inner diameter of 1.1 cm. The resulting foam qualities range from 77 to 89 per cent.

Figure 4:
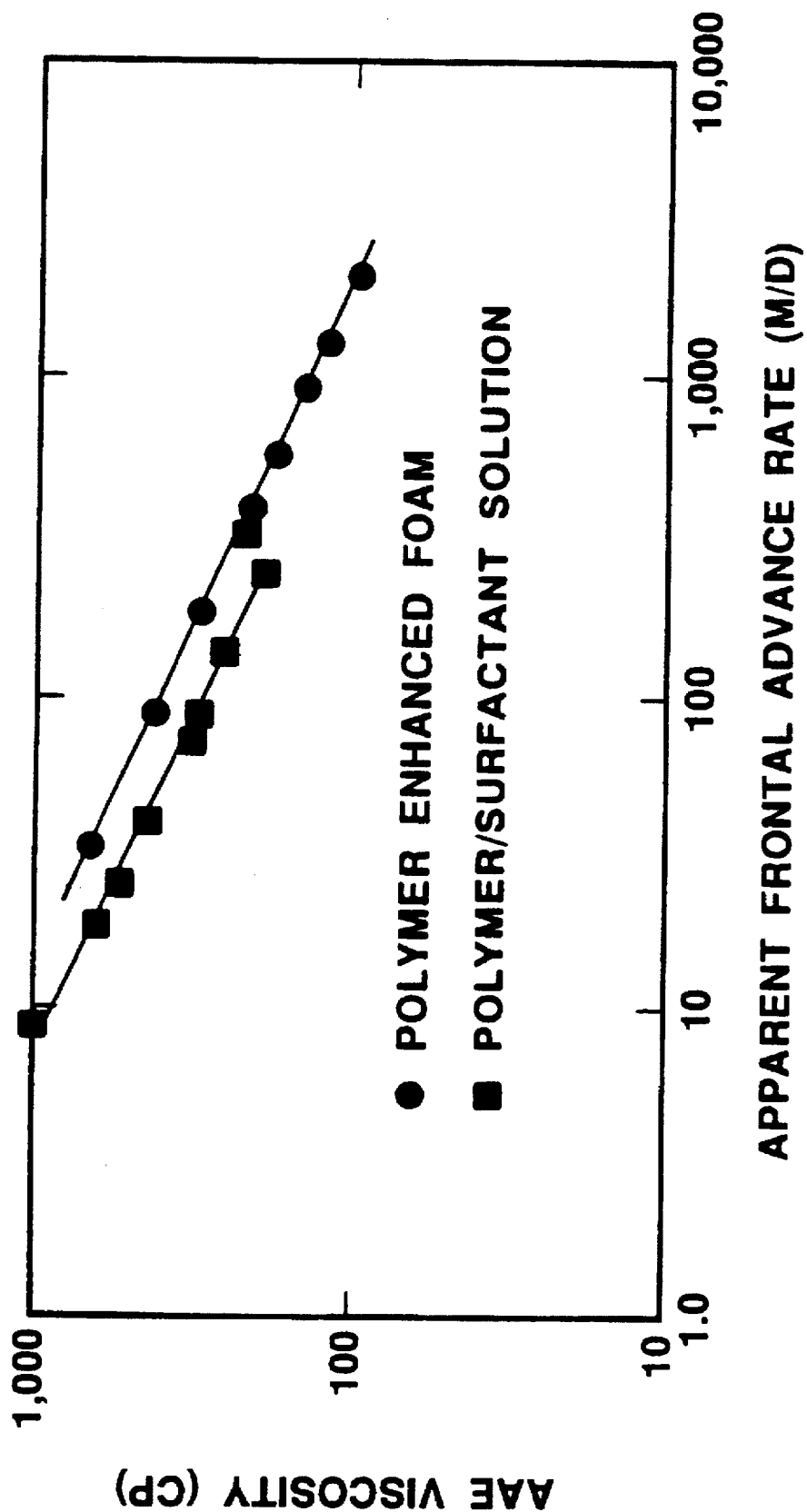
FIG. 4 is a graph of the average apparent effective viscosity in a sand pack as a function of the apparent frontal advance rate for a polymer-surfactant solution and for a polymer enhanced foam generated from the same solution.

FIG. 4 shows the apparent average effective viscosity (AAE) of the aqueous polymer solution and polymer enhanced foams as a function of the apparent frontal advance rate. The polymer enhanced foam is a shear thinning fluid, and the viscosity behavior conforms to the power-law model over the range of frontal advance rates and shear rates studied. The viscosity and shear thinning properties of the polymer enhanced foam mirror the viscosity and shear thinning properties of the polymer solution. Further, the viscosity of the polymer enhanced foam is very similar to the viscosity of the polymer solution. Thus, the quantity of polymer can be significantly reduced by using a foam rather than a polymer solution, resulting in similar rheological performance with a significant decrease in the cost of the polymer and polymer solution used in a completion, workover, or kill operation.

EXAMPLE 6

Effects Of Pressure On Frontal Advance Rate And Effective Viscosity

Polymer enhanced foams are prepared using a solution of 2,000 ppm surfactant and 7,000 ppm of PHPA with a molecular weight of 11,000,000 in a reservoir brine and using $N_2$ as the gas phase. The brine, surfactant, and polymer are the same as those used in Example 4. The foam qualities range from 81 to 89 per cent. One set of foams is formed by injecting the polymer/surfactant solution and the gas directly into a 120 darcy test sand pack at 22° C. and atmospheric backpressure. The sand pack is 30 cm long and has an inner diameter of 1.0 cm. The sand pack functions as a foam generating device and a model of a porous medium. The second flood is preformed in a 120 darcy foam generating sand pack and then injected into a 120 darcy test sand pack at 3,450 kPa injection pressure and 22° C.

Figure 5:
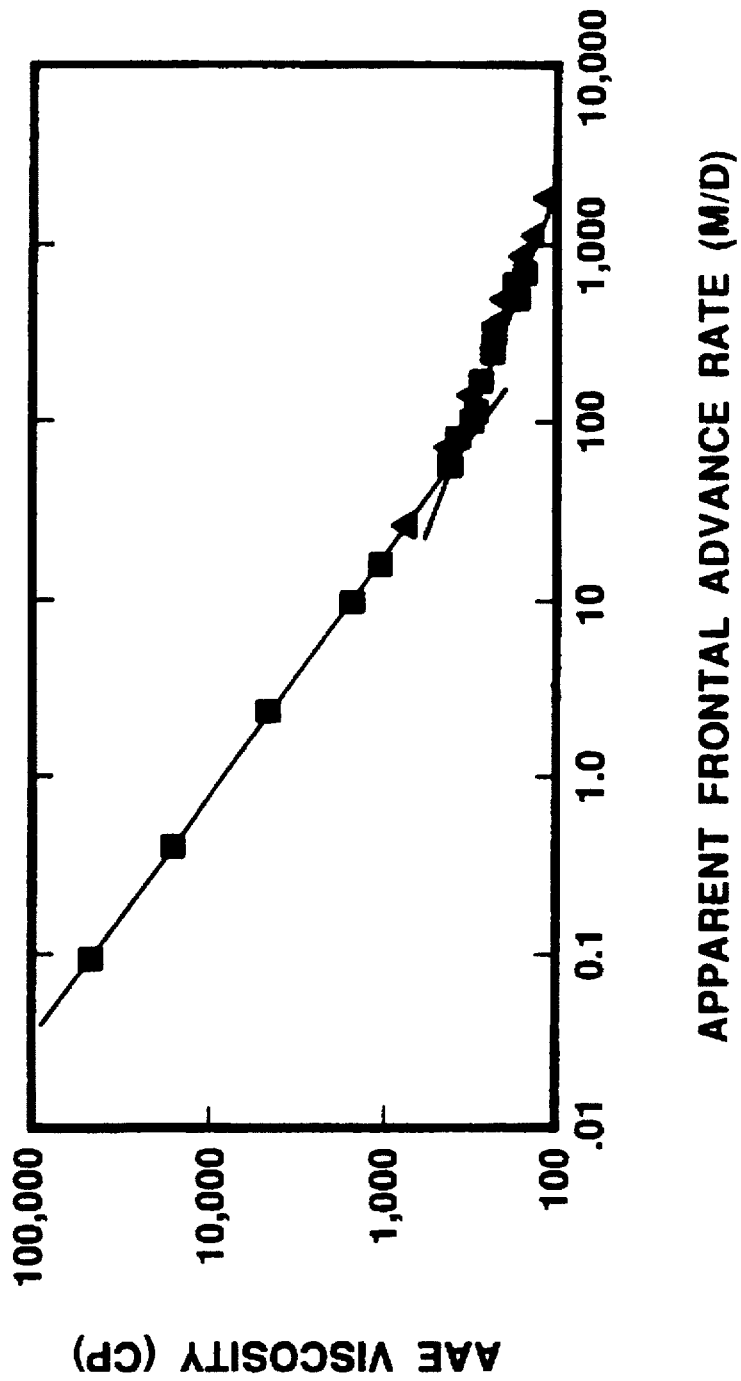
FIG. 5 is a graph showing the average apparent effective viscosity as a function of the apparent frontal advance rate for the same polymer enhanced foam injected into a sand pack at atmospheric backpressure and at 3,450 kPa injection pressure.

FIG. 5 shows the average apparent effective viscosity as a function of the apparent frontal advance rate for the in-situ-generated foam and the preformed foam. The high pressure data shown in FIG. 5 are comparable to the atmospheric pressure data of Example 5, which are plotted as triangles. These data and the data shown in FIG. 4 (Example 5) indicate that the apparent viscosities of the polymer enhanced foams are nearly independent of pressure. Additionally, it is shown that very large effective viscosities can be attained at low shear rates, and the rheological properties of preformed and in-situ-generated foams are nearly identical.

EXAMPLE 7

Effect Of Temperature On Foam Stability

A polymer enhanced foam is prepared using the reservoir brine containing 2,000 ppm of surfactant, 7,000 ppm of PHPA with a molecular weight of 11,000,000, and $N_2$. The surfactant, polymer, and brine are the same as those used in Example 4. The polymer enhanced foam is generated in a 170 darcy foam generating sand pack at an apparent frontal advance rate of about 1,524 m/day. The sand pack has a length of 30 cm and a diameter of 1.1 cm, and the experiment is conducted at 22° C. and repeated at 51 ° C. 100 ml of each foam effluent is collected in a stoppered graduated cylinder and aged at 22° C. and 51° C., respectively. The foam volumes are observed during the next 24 hours, and the results are shown in Table I. Increasing the temperature from 22° to 51° C. has no significant effect on the stability of the polymer enhanced foam for the first seven hours of aging. In addition, the polymer enhanced foam shows superior stability to that of a conventional foam at 51° C.

As noted during the flooding experiments, the effective viscosity of the foam decreases as the temperature increases. At each temperature, the effective viscosity of the polymer enhanced foam is proportional to the effective viscosity of the polymer solution alone, which is inversely proportional to the temperature.

TABLE I

| Aging Time (hr) | Foam Volume (cm³) 22° C. | Foam Volume (cm³) 51° C. |
|---|---|---|
| 0.25 | 100. | 100. |
| 1.0 | 100. | 100. |
| 2.0 | 97. | 98. |
| 3.0 | 94. | 94. |
| 4.0 | 92.* | 91.** |
| 5.0 | 89.** | 89.** |
| 7.0 | 87.** | 88.** |
| 24.0 | 85.** | 58.** |

*Fragile and light foam
**Extremely fragile and coarse foam

EXAMPLE 8

Effect Of Polymer Concentration

Figure 6:
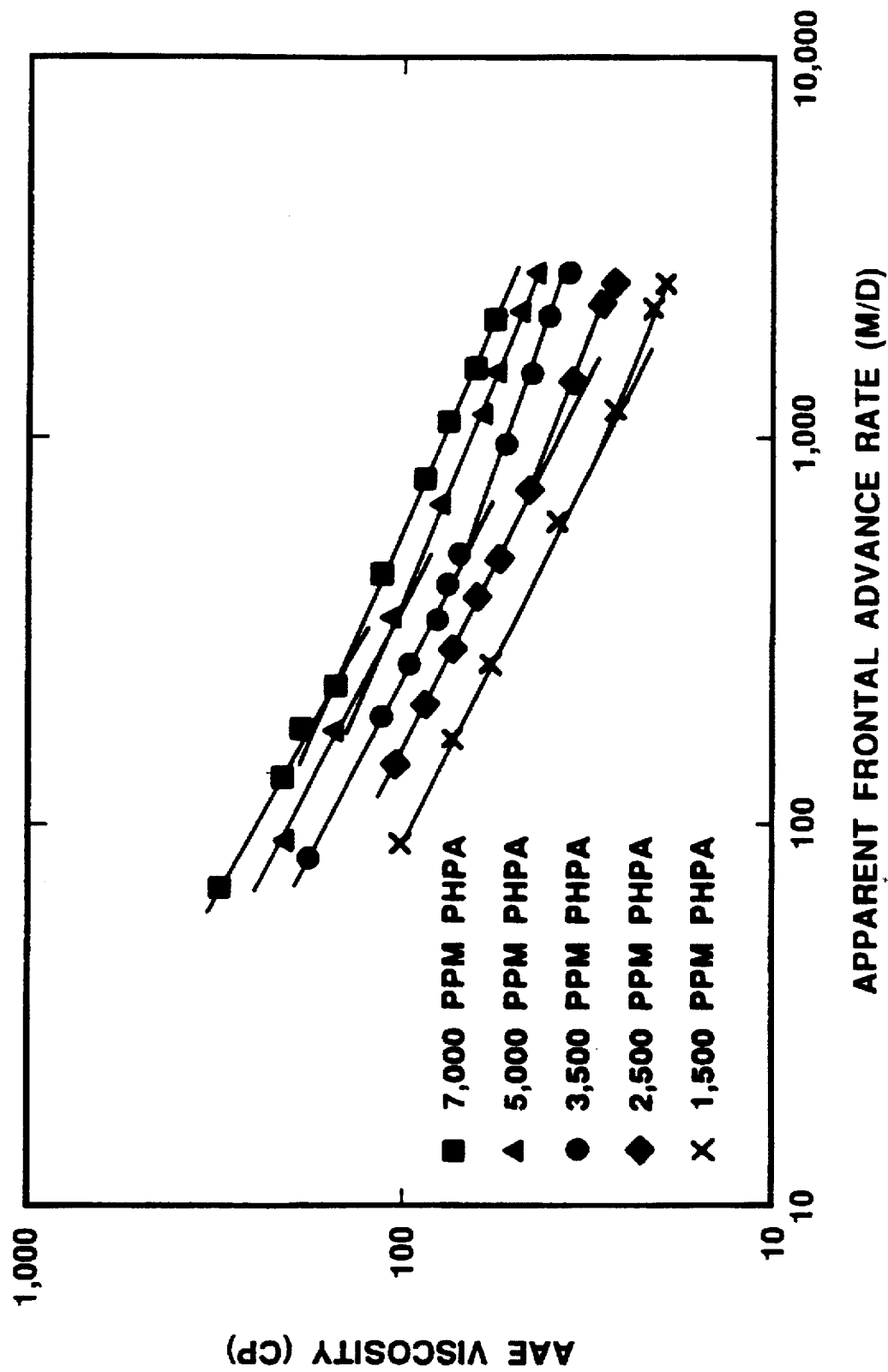
FIG. 6 is graph showing the average apparent effective viscosities as a function of apparent frontal advance rate in a sand pack for a series of polymer enhanced foams having different polymer concentrations.

Polymer enhanced foams are prepared with an aqueous phase consisting of 2,000 ppm of an alpha olefin sulfonate surfactant, a reservoir brine, and PHPA concentrations of 1,500; 2,500; 3,500; 5,000; and 7,000 ppm, and with $N_2$ as the gas phase. The brine, surfactant, and PHPA are the same as those of Example 4. The polymer solution viscosities are 50, 280, 800, 3,300 and 4,800 cp, respectively, at a shear rate of 1.0 sec$^{-1}$. The foams are generated in a 140 darcy sand pack with a pressure drop of 138–1,380 kPa and a frontal advance rate of 61–3,048 m/day. The sand pack serves both foam generating and test functions and has a length of 30 cm and a diameter of 1.1 cm. The foam qualities range between 85 and 89 per cent. As shown in FIG. 6, significant viscosities are observed for all polymer concentrations studied, and the average effective viscosity is proportional to the polymer concentration.

EXAMPLE 9

Effect Of Surfactant Concentration

Figure 7:
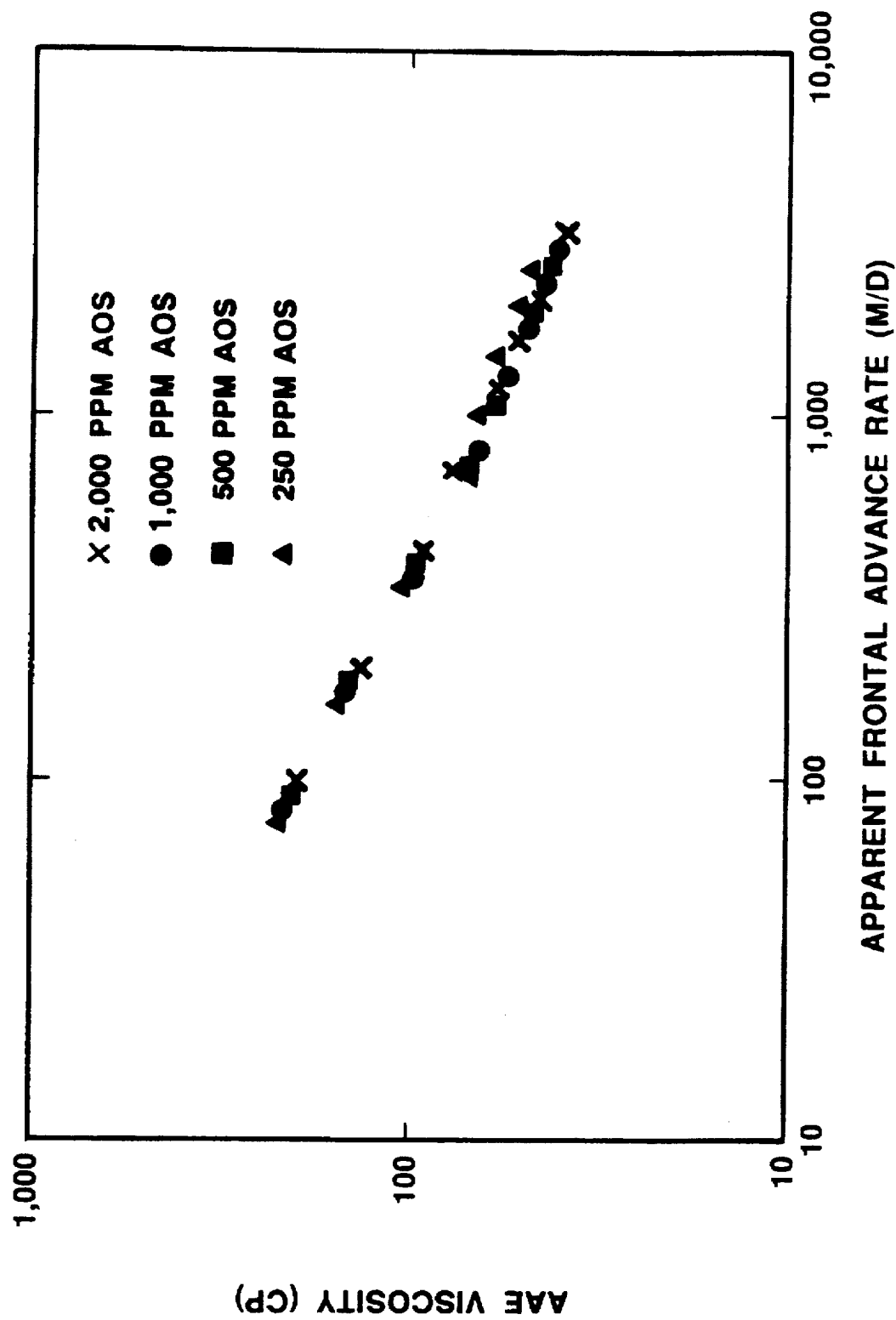
FIG. 7 is a graph showing the average apparent effective viscosities as a function of apparent frontal advance rate in a sand pack for a series of polymer enhanced foams having different surfactant concentrations.

Polymer enhanced foams are prepared using a reservoir brine containing 7,000 ppm of 30% hydrolyzed PHPA having a molecular weight of 11,000,000 and surfactant concentrations of 250 ppm; 500 ppm; 1,000 ppm; and 2,000 ppm. The brine, surfactant (alpha olefin sulfonate, or AOS), and polymer are the same as those used in Example 4. The foams are generated with $N_2$ in a 140 darcy foam generating and test sand pack with a pressure drop of 138–1,380 kPa, and the foam qualities are between 85 and 89 par cent. The sand pack is 30 cm long and has an inner diameter of 1.1 cm. As shown in FIG. 7, the surfactant concentration has little or no effect on polymer enhanced foam viscosity over a broad range of surfactant concentrations. Thus, by using a polymer enhanced foam completion, workover, or kill fluid, the concentration of surfactant in the foam can be kept relatively low without decreasing the viscosity or changing the foam's rheological properties, thereby reducing the cost of the completion, workover, or kill operation.

EXAMPLE 10

Effect Of Gas Composition

Figure 8:
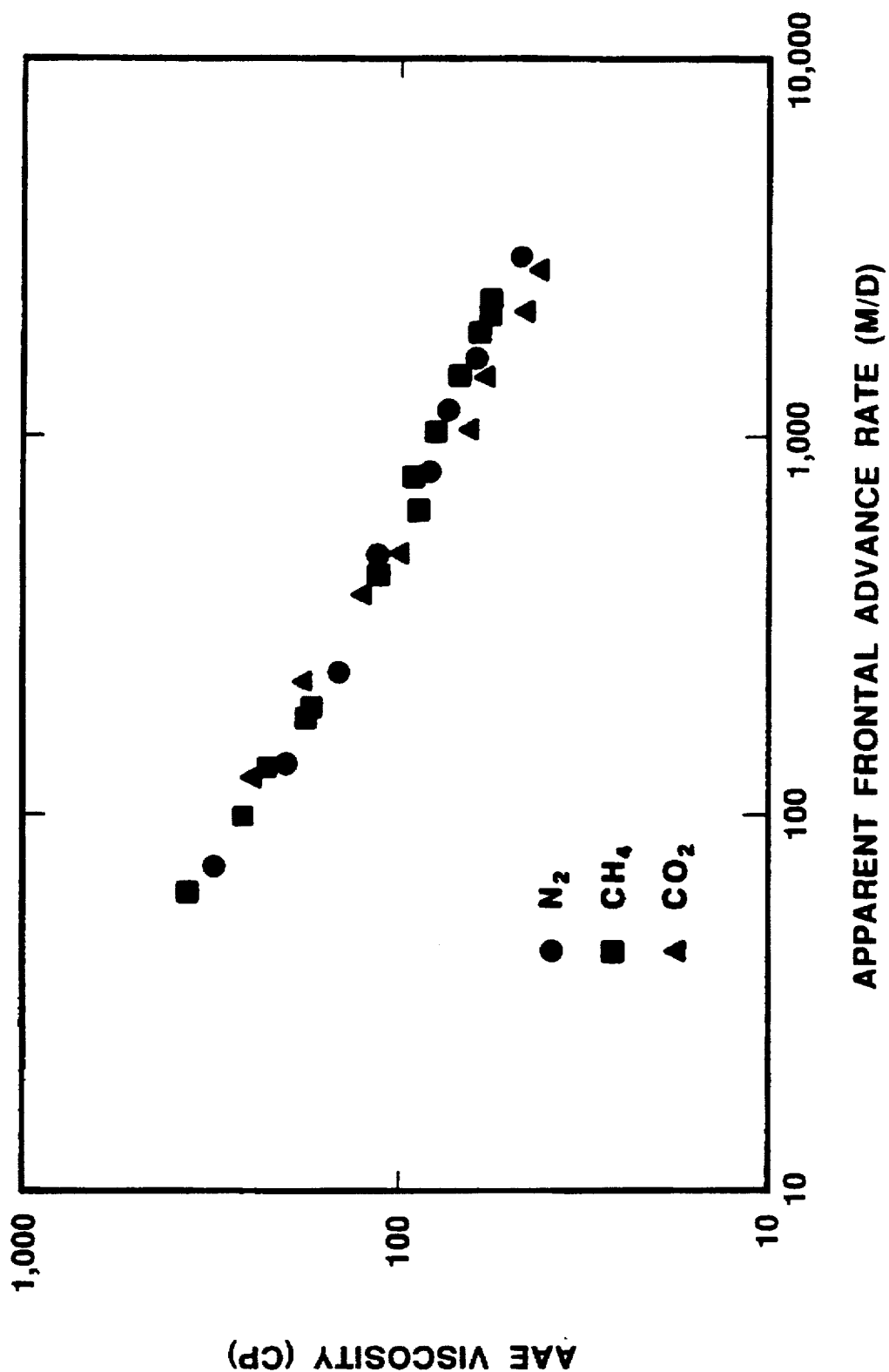
FIG. 8 is a graph showing the average apparent effective viscosities as a function of apparent frontal advance rate in a sand pack for a series of polymer enhanced foams generated with different gases and having similar foam qualities.

Polymer enhanced foams are prepared using 7,000 ppm PHPA and 2,000 ppm BIO-TERGE AS-40 surfactant in a reservoir brine and with different gases. The brine, surfactant, and PHPA are the same as those used in Example 4. The solution pH is 7.5. Foam qualities range between 85 and 90 per cent with $N_2$, 85 and 89 per cent with $CH_4$, and 87 and 89 per cent with $CO_2$. Frontal advance rates are observed in a 150 darcy sand pack with a pressure drop between 207 and 1,380 kPa. The polymer enhanced foam performances are very similar with all three gases, as shown in FIG. 8. In particular, the acidity of the $CO_2$ foam had no significant effect on the polymer enhanced foam viscosity performance. Thus, almost any available gas can be utilized as a foaming agent in the completion, workover, or kill fluid, and the rheological performance of the polymer enhanced foam appears to be insensitive to the gas composition utilized.

EXAMPLE 11

Effect Of Brine Composition

Figure 9:
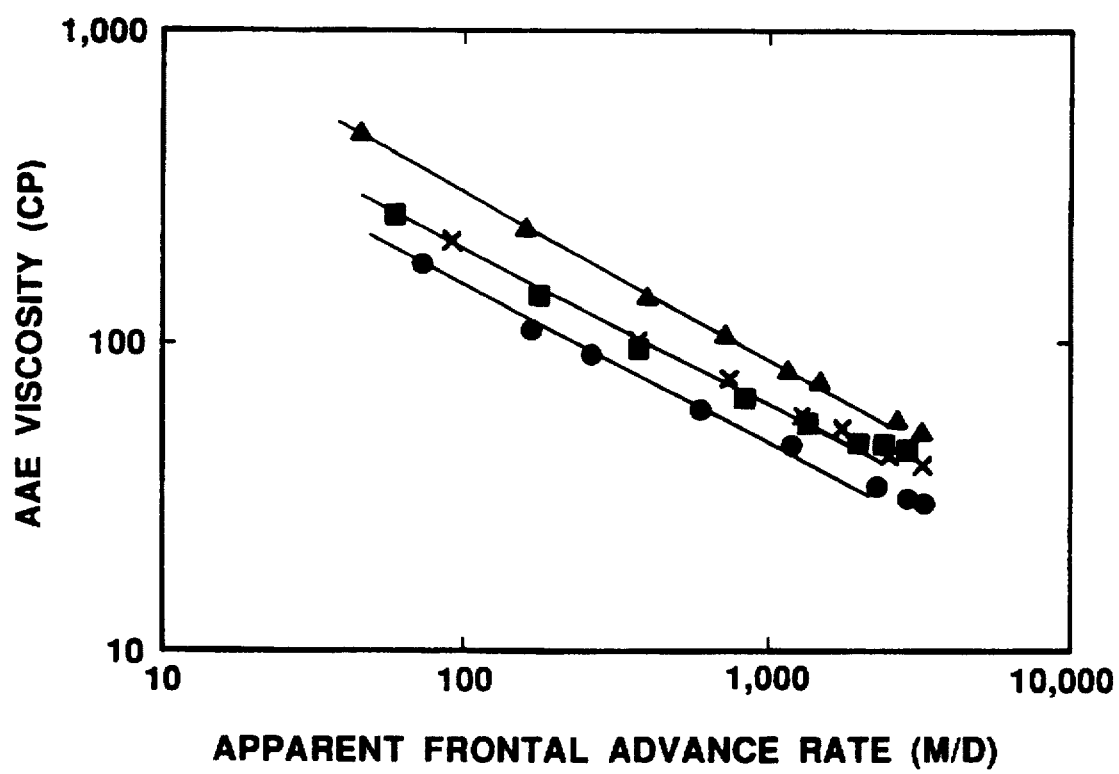
FIG. 9 is a graph showing the average apparent effective viscosities as a function of apparent frontal advance rate in a sand pack for a series of polymer enhanced foams having fresh water and brine solvents and polyacrylamide polymers with different degrees of hydrolysis.

Four polymer enhanced foams are formulated with 30 per cent hydrolyzed PHPA and unhydrolyzed PA, both having molecular weights of 11,000,000, and with fresh water and brine. The brine contains 5,700 ppm total dissolved solids, with high concentrations of $Ca^{2+}$, $Mg^{2+}$, and $SO_4^{2-}$. The polymer concentration in the aqueous phase is 7,000 ppm, the surfactant is BIO-TERGE AS-40 at a concentration of 2,000 ppm in the aqueous phase, and the gas is $N_2$. Foams are formed in a foam generating sand pack as described above. As shown in FIG. 9, for any given apparent frontal advance rate, the effective viscosity of each polymer enhanced foam is proportional to the viscosity of the aqueous polymer solution from which it was formed. As expected for polyacrylamides due to hydrolysis and salinity interactions, the viscosities of polymer solutions with higher salinity are less than the viscosities of fresh water solutions which contain the same polymer concentration. When the brine and fresh water polymer solutions have approximately the same viscosity, the polymer enhanced foams generated with those solutions also have similar viscosities. The percent of hydrolysis of the polymer has the same effect on the rheology of the polymer solution and the polymer enhanced foam, with greater effective viscosities for otherwise identical polymer solutions and polymer enhanced foams containing polymers with higher levels of hydrolysis.

EXAMPLE 12

Effect Of Polymer Molecular Weight

Figure 10:
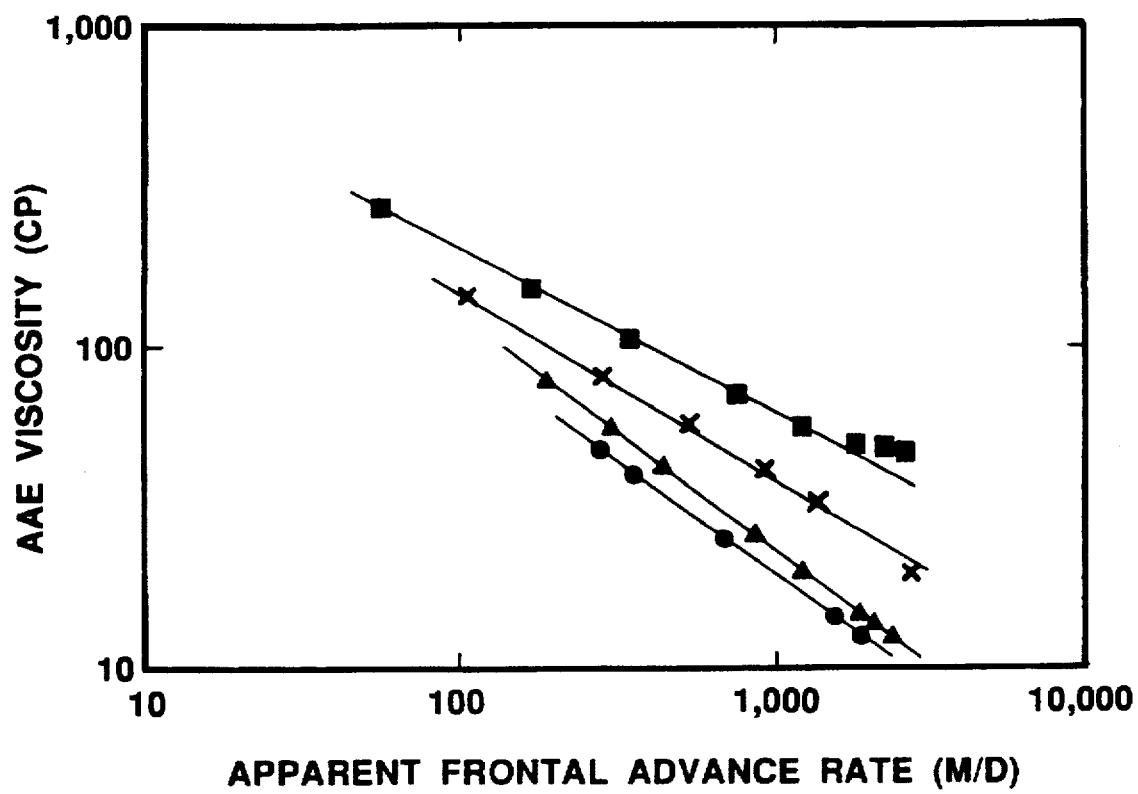
FIG. 10 is a graph showing the average apparent effective viscosities as a function of apparent frontal advance rate in a sand pack for a series of polymer enhanced foams containing polyacrylamide polymers of differing molecular weights.

Polymer enhanced foams are prepared in a foam generating sand pack as described above, using $N_2$; 2,000 ppm of BIO-TERGE AS-40 surfactant in the aqueous phase ("AQ. SOLN."); and unhydrolyzed polyacrylamide concentrations in the aqueous phase and molecular weights as shown in FIG. 10. Increasing the polymer molecular weight increases the viscosity of the polymer solution and the polymer enhanced foam formed from the solution. Further, the viscosity of the aqueous phase from which the polymer enhanced foam is formed controls the effective viscosity of the polymer enhanced foam. Thus, the same viscosity performance can be achieved for a given polymer enhanced foam by increasing the polymer molecular weight and using less polymer in the foam, resulting in significant cost savings.

EXAMPLE 13

Effect Of pH

Figure 11:
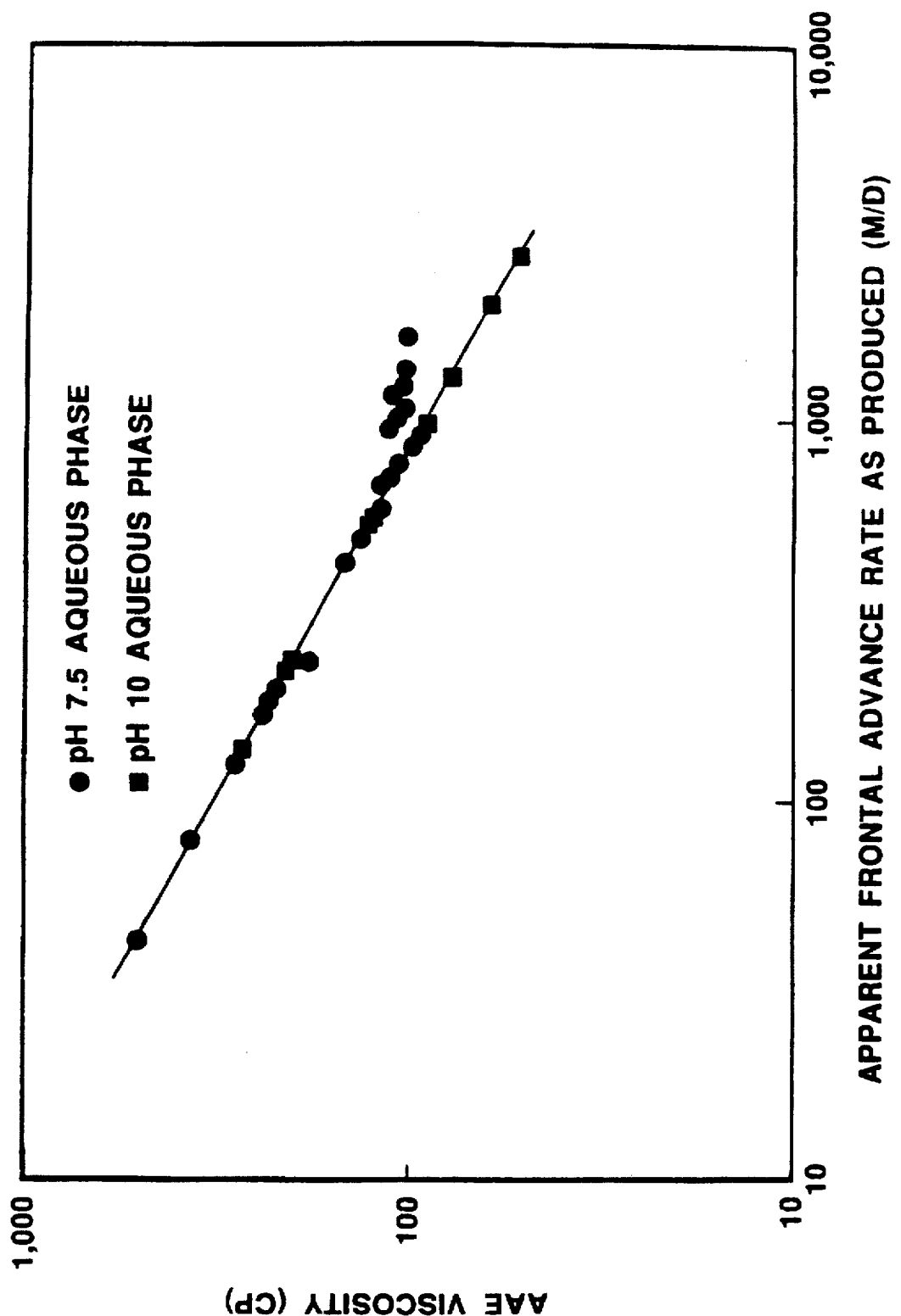
FIG. 11 is a graph showing the average apparent effective viscosities as a function of apparent frontal advance rate in a sand pack for polymer enhanced foams having aqueous phase pH values of 7.5 and 10, respectively.

Two brine solutions are prepared having 11,000,000 molecular weight PHPA concentrations of 7,000 ppm and BIO-TERGE AS-40 surfactant concentrations of 2,000 ppm. The brine is the same as that used in Example 11, and the PHPA is the same as that used in Example 4. The pH of one solution is adjusted to 7.5, and the pH of the other is adjusted to 10. Polymer enhanced foams are formed with $N_2$ in a 30 cm long combined foam generating and test sand pack having a permeability of 150 darcies. Atmospheric backpressure is maintained, with a pressure drop across the sand pack of 138–1,380 kPa. As shown in FIG. 11, the average effective viscosity and rheological performance of these polymer enhanced foams are essentially independent of the pH over the range studied.

While the foregoing preferred embodiments of the invention have been described and shown, it is understood that alternatives and modifications, such as those suggested and others, may be made thereto and fall within the scope of the present invention.

I claim:

1. A process for use during hydrocarbon well completion, workover, and kill operations, the process comprising the steps of:

(a) preparing an aqueous solution of a water-soluble, substantially noncrosslinked polymer and a water-soluble surfactant, the aqueous solution being substantially free of agents capable of crosslinking the polymer; and (b) adding a gas to said aqueous solution so as to form a polymer enhanced foam; and (c) placing said foam in a well penetrating a subterranean formation during a completion, workover, or kill operation.

2. The process of claim 1 wherein said gas is added to said solution prior to placing said solution in said well.

3. The process of claim 1 wherein said gas is added to said solution as said solution is placed in said well.

4. The process of claim 1 wherein said gas is added to said solution within said well.

5. The process of claim 1 wherein said foam is a well completion fluid and step (c) involves placing said foam in said well penetrating said subterranean formation during a completion operation.

6. The process of claim 1 wherein said foam is a workover fluid and step (c) involves placing said foam in said well penetrating said subterranean formation during a workover operation.

7. The process of claim 1 wherein said process additionally comprises the step of adjusting the pH of said aqueous solution to a value between about 4 and about 10.

8. The process of claim 1 additionally comprising the step of mixing a foam breaker with said foam.

9. The process of claim 1 wherein said formation is hydrocarbon bearing.

10. The process of claim 1 wherein said surfactant is selected from the group consisting of ethoxylated alcohols, ethoxylated sulfates, refined sulfonates, petroleum sulfonates, alpha olefin sulfonates, and mixtures thereof.

11. The process of claim 1 wherein said surfactant is present in an amount between about 20 ppm and 50,000 ppm of said solution.

12. The process of claim 1 wherein said surfactant is present in and amount between about 50 ppm and 20,000 ppm of said solution.

13. The process of claim 1 wherein said surfactant is present in an amount between about 1,000 ppm and 20,000 ppm of said solution.

14. The process of claim 1 wherein said gas is selected from the group consisting of nitrogen, air, carbon dioxide, flue gas, produced gas, natural gas, and mixtures thereof.

15. The process of claim 1 wherein said gas is selected from the group consisting of nitrogen, carbon dioxide, and mixtures thereof.

16. The process of claim 1 wherein said foam has a gas content between about 20 per cent and about 99 per cent by volume.

17. The process of claim 1 wherein said foam has a gas content between about 60 per cent and about 98 per cent by volume.

18. The process of claim 1 wherein said foam has a gas content between about 70 per cent and about 97 per cent by volume.

19. The process of claim 1 wherein said polymer is selected from the group consisting of biopolymers, acrylamide polymers, and mixtures thereof.

20. The process of claim 19 wherein said biopolymers are selected from the group consisting of xanthan gum, guar gum, succinoglycan, scleroglycan, polyvinylsaccharides, carboxymethylcellulose, o-carboxychitosans, hydroxyethylcellulose, hydroxypropylcellulose, modified starches, and mixtures thereof.

21. The process of claim 19 wherein said acrylamide polymer is selected from the group consisting of polyacrylamide; partially hydrolyzed polyacrylamide; acrylamide copolymers; acrylamide terpolymers containing acrylamide, a second species, and a third species; tetrapolymers containing acrylamide, acrylate, a third species, and a fourth species; and mixtures thereof.

22. The process of claim 21 wherein said acrylamide polymer has a molecular weight between about 10,000 and about 50,000,000.

23. The process of claim 21 wherein said acrylamide polymer has a molecular weight between about 250,000 and about 20,000,000.

24. The process of claim 21 wherein said acrylamide polymer has a molecular weight between about 1,000,000 and about 18,000,000.

25. The process of claim 21 wherein said acrylamide polymer is present in said solution in an amount between about 100 ppm and about 80,000 ppm.

26. The process of claim 21 wherein said acrylamide polymer is present in said solution in an amount between about 500 ppm and about 12,000 ppm.

27. The process of claim 21 wherein said acrylamide polymer is present in said solution in an amount between about 2,000 ppm and about 10,000 ppm.

28. The process of claim 1 wherein said aqueous solution comprises a solvent selected from the group consisting of fresh water and brine.

29. The process of claim 1 wherein said foam is stable in glassware at atmospheric pressure for at least about 6 hours.

30. The process of claim 1 wherein said gas becomes a liquid or a supercritical fluid under temperature and pressure conditions encountered in said well thereby causing said polymer enhanced foam to become an emulsion.

31. A process for use during a hydrocarbon well kill operation, the process comprising the steps of:

(a) preparing an aqueous solution of a water-soluble, substantially noncrosslinked polymer and a water-soluble surfactant, the aqueous solution being substantially free of agents capable of crosslinking the polymer; and (b) adding a gas to said aqueous solution so as to form a polymer enhanced foam; and (c) placing said foam in a well penetrating a subterranean formation during a kill operation.

32. A process for use during hydrocarbon well completion, workover, and kill operations, the process comprising the steps of:

(a) preparing an aqueous solution of a water-soluble, substantially noncrosslinked polymer and a water-soluble surfactant, the aqueous solution being substantially free of agents capable of crosslinking the polymer; and (b) adding a gas to said aqueous solution so as to form a polymer enhanced foam which is a shear thinning fluid; and (c) placing said foam in a well penetrating a subterranean formation during a completion, workover, or kill operation.

33. A process for use during hydrocarbon well completion, workover, and kill operations, the process comprising the steps of:

(a) preparing an aqueous solution of a water-soluble, substantially noncrosslinked polymer and a water-soluble surfactant, the aqueous solution being substantially free of agents capable of crosslinking the polymer; and (b) adding a gas to said aqueous solution so as to form a polymer enhanced foam which is rehealable; and (c) placing said foam in a well penetrating a subterranean formation during a completion, workover, or kill operation.

* * * * *